(12) United States Patent
Shimaoka et al.

(10) Patent No.: US 7,125,144 B2
(45) Date of Patent: Oct. 24, 2006

(54) ILLUMINATION DEVICE AND ILLUMINATION METHOD

(75) Inventors: Yusaku Shimaoka, Osaka (JP); Takamasa Yoshikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 18 days.

(21) Appl. No.: 10/512,776

(22) PCT Filed: Oct. 9, 2003

(86) PCT No.: PCT/JP03/12927

§ 371 (c)(1),
(2), (4) Date: Oct. 27, 2004

(87) PCT Pub. No.: WO2004/034141

PCT Pub. Date: Apr. 22, 2004

(65) Prior Publication Data

US 2005/0225978 A1    Oct. 13, 2005

(30) Foreign Application Priority Data

Oct. 11, 2002    (JP)    ............................. 2002-299464

(51) Int. Cl.
    *F21V 5/04*    (2006.01)
(52) U.S. Cl. ...................... 362/243; 362/245; 362/247; 362/299; 362/300; 362/309; 362/328
(58) Field of Classification Search ................ 362/243, 362/244, 245, 247, 299, 300, 309, 328, 235; 353/29, 102, 94, 30, 121; 349/62
See application file for complete search history.

(56) References Cited

U.S. PATENT DOCUMENTS

| 953,105 | A | * | 3/1910 | Schneider ................... 353/81 |
| 5,418,583 | A | | 5/1995 | Masumoto |
| 5,649,753 | A | * | 7/1997 | Masumoto .................. 353/102 |
| 6,222,674 | B1 | | 4/2001 | Ohta |
| 6,224,217 | B1 | | 5/2001 | Tanaka |
| 6,402,325 | B1 | | 6/2002 | Yamamoto |

FOREIGN PATENT DOCUMENTS

| JP | 5-346557 | 12/1993 |
| JP | 11-66926 | 3/1999 |

(Continued)

OTHER PUBLICATIONS

International Search Report corresponding to application No. PCT/JP03/12927 dated Jan. 20, 2004.

*Primary Examiner*—Sandra O'Shea
*Assistant Examiner*—Sharon Payne
(74) *Attorney, Agent, or Firm*—RatnerPrestia

(57) ABSTRACT

An illumination device includes plural lamps, a prism, a first lens array, and a second lens array, wherein the first lens array is formed such that images of the lamps are formed a predetermined space apart from each other on a lens, which corresponds to a predetermined lens among plural lenses of a second lens array, by light from the lamps having passed the predetermined lens of the first lens array. All or a part of plural images formed by a lens separate from the predetermined lens of the first lens array are practically arranged among the formed images of the lamps. And the second lens array is formed such that the images formed on the second lens array are irradiated on a light-receiving surface in a predetermined relation.

11 Claims, 14 Drawing Sheets

FOREIGN PATENT DOCUMENTS

| | | |
|---|---|---|
| JP | 11-174373 | 7/1999 |
| JP | 2000-171901 | 6/2000 |
| JP | 2000-180796 | 6/2000 |
| JP | 2000-305167 | 11/2000 |
| JP | 2001-268588 | 9/2001 |

* cited by examiner

FIRST LENS ARRAY
THE NUMBER OF LENSES IS 48

SECOND LENS ARRAY
THE NUMBER OF LENSES IS 60

FIRST LENS ARRAY
THE NUMBER OF LENSES IS 42

SECOND LENS ARRAY
THE NUMBER OF LENSES IS 46

(a)

(b)

Fig. 14 (a)  PRIOR ART
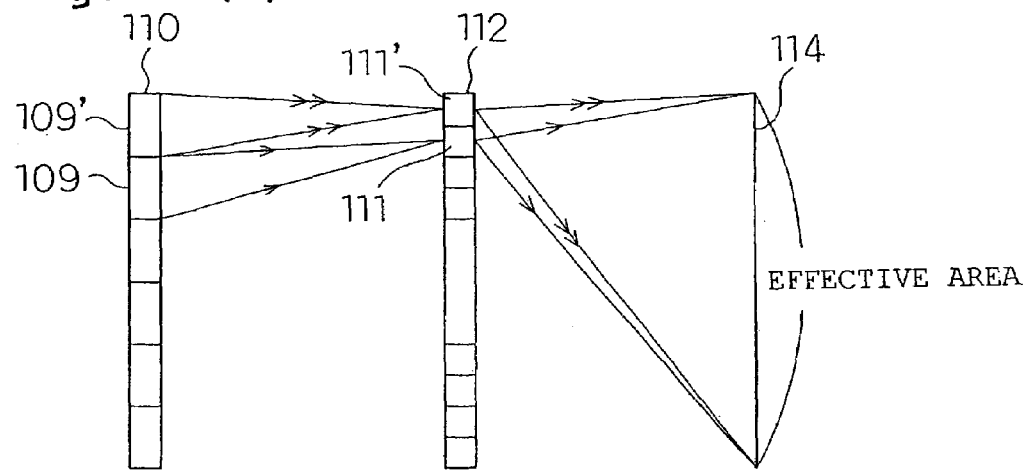
Fig. 14(b)
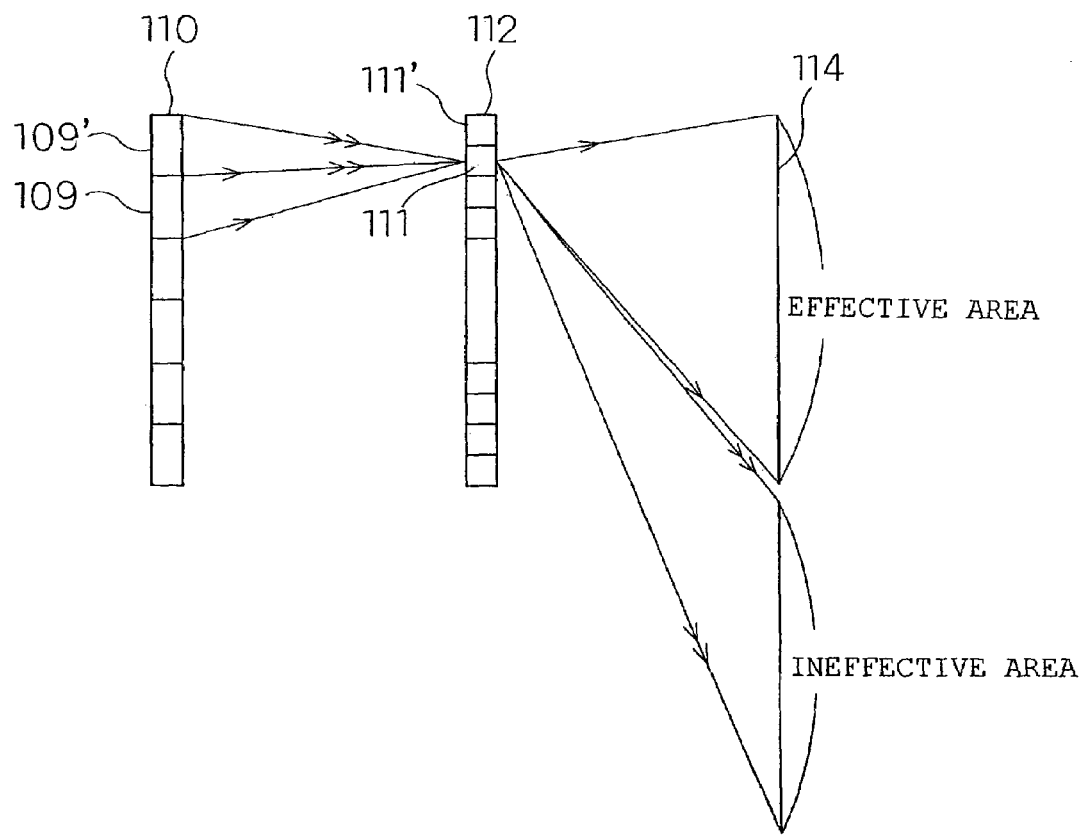

ILLUMINATION DEVICE AND ILLUMINATION METHOD

This application is a U.S. National phase application of PCT international application PCT/JP03/12927.

TECHNICAL FIELD

The present invention relates to an illumination device and an illumination method of illuminating, for example, a display device in a projection display apparatus of projecting a large-screen image or the like on a screen.

BACKGROUND ART

In recent years, as a projection video apparatus capable of performing large-screen display, various projection display apparatuses (projectors) using an optical modulation device have been attracting attention. These projection display apparatuses use light emitted from a light source serving as light generating means to illuminate a liquid crystal of a transmission type or a reflection type or an optical modulation device, which can perform optical modulation, such as a DMD (digital micro-mirror device) which can change a reflection direction with micro-mirrors arranged in array, form an optical image, which corresponds to a video signal supplied from the outside of the optical modulation device, on the optical modulation device, and enlarge and project the optical image, which is illumination light modulated by the optical modulation device, on a screen with a projection lens.

Examples of an important optical characteristic of a large screen projected in this way include brightness and uniformity of the brightness. It is important to condense light, which is generated from a lamp serving as a light source, on an optical modulation device serving as a light-receiving surface and illuminate the optical modulation device with light beams having little unevenness of brightness. It has been strongly requested to improve efficiency of an illumination device of illuminating the optical modulation device and make brightness uniform.

In order to meet such a request, for example, an illumination device, which has a lens array constituted by irregular-shaped aperture lenses, has been proposed. FIG. 9 shows a structure of the illumination device. Beams of light emitted by a lamp 101 provided in a parabolic mirror 102 are divided by a first lens array 110 in which lenses having substantially the same shaped aperture are arranged two-dimensionally. Thereafter, the light reaches a light-receiving surface 106 via a second lens array 112 which has lenses of the same number as the divided light beams, that is, the same number as the lenses of the first lens array 110. In other words, the second lens array 112 is arranged such that the light beams, which have reached thereto from a predetermined lens of the first lens array 110, pass through a corresponding lens on the second lens array 112 to reach the light-receiving surface 106 (effective area). The divided light beams reach the light-receiving surface 106 and are superimposed one on top of another.

For example, FIG. 9 shows a state in which light passing through a second lens from the above of the first lens array 110 passes through a second lens from the above of the second lens array 112, which is in a correspondence relation with the lens of the first lens array 110, and is irradiated on the light-receiving surface 106. The respective light beams divided by the first lens array 110 pass through respective lenses of the second lens array 112, which are in a correspondence relation with the lenses of the first lens array 110, and are superimposed one on top of another on the light-receiving surface 106. Thus, even if a distribution of luminance of light emitted from the lamp 101 is uneven, uniform brightness can be obtained on the light-receiving surface 106.

In addition, at this point, light substantially parallel with an optical axis made incident on the first lens array 110 is condensed by the respective lenses in the first lens array 110 and forms light source images on the corresponding respective lenses of the second lens array. At this point, due to optical characteristics of the light source and the parabolic mirror, light close to an optical axis 7 is focused as a relatively large image, and light distant from the optical axis 7 is focused as a relatively small image on the second lens array 112. Therefore, as shown in FIG. 9, on the second lens array 112, lenses with a large aperture are arranged in the central part close to the optical axis, and lenses with a small aperture are arranged in the peripheral part distant from the optical axis. Consequently, the lens array constituted by the irregular-shaped aperture lenses as described above is adopted as the second lens array 112, whereby improvement of efficiency of the illumination device can be realized.

In the above-described method, in order to further improve efficiency, an arrangement of the light source images formed on the second lens array 112 is changed by adjusting (decentering) positions of center of curvature of the respective lenses in the first lens array 110. For example, in order to eliminate overlapping of light sources images in the vicinity of the optical axis, the positions of center of curvature of the respective lenses in the first lens array 110 are adjusted such that large useless spaces are eliminated by increasing spaces among the light source images in the vicinity of the optical axis and decreasing spaces among the light source images in the peripheral part. In addition, on the second lens array 112, light overflowing from the apertures can be reduced by, for example, increasing sizes the apertures through which light beams in the vicinity of the optical axis are passed while keeping sizes of the apertures through which light beams in the peripheral part are passed. Higher efficiency of use of light could be obtained by optimizing a shape of the second lens array such that the respective lenses in the second lens array 112 include the respective light source images in this way (e.g., see Japanese Patent Laid-Open No. 05-346557). FIG. 10 shows an example of an image which is formed on the second lens array 112 obtained as described above.

In addition, as shown in FIG. 11, there is also an illumination system with which high efficiency can be obtained by using plural light sources (e.g., see Japanese Patent Laid-Open No. 2000-171901). In this case, the second lens array 112 is not formed in an optimal shape as described in Japanese Patent Laid-Open No. 05-346557, but a second lens array (with apertures of the same shape) having substantially the same shape as the first lens array 110 is used.

Also, in a constitution described in Japanese Patent Laid-Open No. 2000-171901, and in a constitution in which a method of synthesizing plural light sources described in Japanese Patent Laid-Open No. 2000-171901 is applied to a constitution described in Japanese Patent Laid-Open No. 05-346557, as in the case in which the single light source is used, light source images formed in the central part of the lens array 112 are light source images which are large compared with light source images formed in the peripheral part. This phenomenon will be hereinafter described with reference to FIG. 11.

Since an ellipsoidal mirror 2 has a focusing action like a lens, light beams irradiated from a light-emitting portion 16 of a first focus 15 are condensed in the vicinity of a second focus 17 to form an image of the light-emitting portion 16 on the second focus 17 side on a prism 4. However, an action of the ellipsoidal mirror 2 is different from an action of a lens in the following point. That is, if a lens is used instead of using the ellipsoidal mirror 2, in the case of the lens, a ratio of a distance from a position of the light-emitting portion 16 to a lens surface having the focusing action and a distance from the lens surface to a position, where an image is focused, is always fixed whichever position of the lens light passes On the other hand, in the case in which the ellipsoidal mirror 2 is used, if a distance from the first focus 15, where the light-emitting portion 16 of the lamp 1 is arranged, to a reflection surface of the ellipsoidal mirror 2 having the focusing action is short, a distance from a position of the reflection surface to a second focus 17, where a light source image is formed, is long. In such a case, a relatively large light source image is formed on the second focus 17 side on the prism 4. Conversely, as the distance from the first focus 15 to the reflection surface of the ellipsoidal mirror 2 becomes longer, the distance from the reflection surface of the ellipsoidal mirror 2 to the second focus 17 becomes shorter. In such a case, a relatively small light source image is formed on the second focus 17 side.

Therefore, in the optical system shown in FIG. 11, when a light beam irradiated from the light-emitting portion 16 of the lamp 1 is reflected in the vicinity of the optical axis of the ellipsoidal mirror 2, the distance from the reflection surface of the ellipsoidal mirror 2 to the second focus 17 side on the prism 4 becomes relatively long. As indicated by a single arrow in FIG. 11, a light beam made incident on a synthesis mirror 6 of the prism 4 through such a path has a large outgoing angle and is made incident in the vicinity of an optical axis of a lens 8. As a result, this light beam passes through a lens 109 in the vicinity of the optical axis 7 of the first lens array 110 and focuses a relatively large light source image on a lens 111 in the central part of the second lens array 112.

On the other hand, when a light beam irradiated from the light-emitting portion 16 of the lamp 1 is reflected in a position distant from the optical axis of the ellipsoidal mirror 2, the distance from the reflection surface of the ellipsoidal mirror 2 to the second focus 17 side on the prism 4 becomes relatively short. As indicated by a double arrow in FIG. 11, the light beam made incident on the synthesis mirror 6 of the prism 4 through such a path has a small outgoing angle and is made incident in a position distant from the optical axis of the lens 8. As a result, this light beam passes through the lens 109 distant from the optical axis of the first lens array 110 and focuses a relatively small light source image on the lens 111 in the peripheral part of the second lens array 112. Note that the above description is true for a lamp 1' and an ellipsoidal mirror 2'.

In this way, on the second lens array 112, relatively large two light source images are formed in the central part and relatively small two light source images are formed in the peripheral part. In addition, since a size of the light source image is different in the central part and the peripheral part, there is almost no space or there is a small space between two light source images on the second lens array 112 in the central part, but a relatively large space is formed in the peripheral part. FIG. 12 shows an example of a light source image on the second lens array formed as described above. FIG. 12 shows an example in which there are thirty-six lenses 9, there are two light sources, and seventy-two light source images are formed on the lens array 12.

In the illumination optical system using the first lens array 110 and the second lens array 112, only in the case in which a light source image condensed in the respective lenses 109 has passed through the apertures of the corresponding respective lenses 111 of the second lens array 112, the light source image is irradiated on an area, which should be illuminated, as an effective light beam. Therefore, in order to increase light beams which are irradiated on an area which should be illuminated, as in the case of the single light source, it is conceivable to increase a size of the apertures of the respective lenses 111 in the central part of the second lens array 112.

In addition, in another optical system, in the case in which an optical system of separating two polarized components inherent in natural light is arranged between the first lens array 110 and the second lens array 112 even if one light source is used, or in an optical system of making two optical axis substantially agree with each other by the time when light beams reach the second lens array 112 after the light beams are emitted from two light sources and reach the separate lens arrays 110, compared with the number of lenses NLA1 included in the first lens array 110, the number of lenses NLA2 included in the second lens array 112 is made equal to a number found by multiplying the number of light beams from one light source, which is divided by a polarized component or a wavelength band, or the number of light source N=2 by the number of lenses NLA1 of the first lens array as indicated by the following expression, $$NLA2 = 2 \times NLA1 \quad \text{(Expression 1)}$$

whereby an illumination device using plural light beams or light sources is constituted (e.g., see Japanese Patent Laid-Open No. 11-66926 and Japanese Patent No. 3301951).

However, when plural light sources are provided and the second lens array is provided with regular-shaped apertures or irregular-shaped apertures, since a gap exists between a pair of light source images formed on lenses in the peripheral part of the second lens array 112, there is a problem in that further improvement of efficiency cannot be attained. In this case, if a light source image, which is formed by a lens separate from the predetermined lens 109 of the first lens array 110, is arranged in the gap between this pair of light source images, since a light beam of a light source image, which is formed by the separate lens 109', inserted between the pair of light source images is not condensed in an area which should be illuminated from the second lens array, after all, efficiency of use of the illumination device is declined.

This will be hereinafter described specifically. FIG. 13 shows an arrangement of images of two light sources on the second lens array 112 in the case in which irregular-shaped aperture lenses are used as the second lens array 112. As it is evident from FIG. 13, compared with light source images in the central part, light source images in the peripheral part of the second lens array are small images with spaces formed among the images.

FIG. 14(*a*) shows paths of light beams passing through the first lens array 110 and the second lens array 112 to reach the light-receiving surface 114 in the case in which irregular-shaped aperture lenses are used as the second lens array 112. Light having passed through a predetermined lens 109 of the first lens array 110 reaches the entire light-receiving surface 114 serving as an area, which should be illuminated (an effective area shown in FIG. 14(*a*)), via the lens 111 on the second lens array 112 corresponding to the lens 109. Then, similarly, light having passed through separate predetermined lens 109' of the first lens array 110 reaches the entire light-receiving surface 114 serving as an area, which should be illuminated, via a lens 111' corresponding to the lens 109'.

Next, it is considered to arrange another pair of light source images in order to make use of the gap between the pair of light source images in the peripheral part of the lens array 112 shown in FIG. 13. As shown in FIG. 14(b), the decentering of the lens 109' is adjusted so as to cause a light beam having passed through the lens 109' of the first lens array 110 to reach the lens 111 instead of reaching the lens 111'.

In other words, the decentering of the lens 109' is adjusted so as to insert at least one light source image of a pair of light source images, which are condensed by the lens 109' separate from the predetermine lens 109 on the lens array 110, between a pair of light source images condensed by the predetermined lens 109 of the lens array 110. Therefore, at this point, the lens 111, which is one aperture having one center of curvature, includes at least three light source images.

The center of curvature of the lens 111 in the second lens array 112 is set so as to irradiate a light beam having passed through the lens 109 of the first lens array 110 on the light-receiving surface 114 via the lens 111. Therefore, a light beam, which passes through the lens 109' to reach the lens 111 having a correspondence relation with the lens 109, cannot reach the entire light-receiving surface 114 serving as an area which should be illuminated (effective area). In other words, the light beam reaches an ineffective area shown in FIG. 14(b). Due to such reasons, with the conventional design method and constitution of decentering the first lens array 110 such that a light source image formed by the lens 109' separate from the predetermined lens 109 of the first lens array 110 is arranged in a gap of light source images formed by the predetermined lens, efficiency of use of the illumination device is declined on the contrary.

Note that the lenses included in the second lens array 112 in FIG. 14 and the lenses included in the second lens array 112 shown in FIG. 9 are shown in the figure in different numbers and shapes. However, this does not relate to the essence of the description.

The constitutions described in Japanese Patent Laid-Open No. 05-346557 and Japanese Patent No. 3301951 have the same problems as the above-described examples. Note that the entire disclosure of the above-described documents is incorporated herein by reference in its entirety.

DISCLOSURE OF THE INVENTION

In view of the above-described problems, it is an object of the present invention to provide an illumination device and an illumination method which can improve efficiency of use of plural light sources.

According to the present invention, an illumination device and an illumination method, which can improve efficiency of use of plural light sources, can be provided.

The $1^{st}$ aspect of the present invention,is an illumination device comprising:
plural light sources;
reflecting means having a reflection surface of reflecting light, which is irradiated from said plural light sources, in predetermined directions in association with the respective light sources;
a first lens array having plural lenses which is arranged a predetermined space apart from said reflecting means; and
a second lens array having plural lenses which is arranged a predetermined space apart from said first lens array,
wherein said first lens array is formed such that images of said plural light sources are formed a predetermined space apart from each other on lenses, which corresponds to a predetermined lens of said first lens array, among the plural lenses of said second lens array by light from said plural light sources having passed the predetermined lens of said first lens array, and all or a part of plural images formed by another lens different from said predetermined lens of said first lens array are arranged substantially among said formed images of said plural light sources, and
said second lens array is formed such that light beams forming light sources images on said second lens array illuminate a light-receiving surface in a predetermined relation.

The $2^{nd}$ aspect of the present invention is the illumination device according to the $1^{st}$ aspect of the present invention, wherein said another lens of said first lens array is formed to be decentered such that all or a part of plural images formed by said another lens are arranged among plural images formed on said second lens array by the predetermined lens of said first lens array.

The $3^{rd}$ aspect of the present invention is the illumination device according to the $2^{nd}$ aspect of the present invention, wherein said second lens array is formed such that the images formed on said second lens array via said another lens of said first lens array are guided to an area, which is to be illuminated, of said light-receiving surface.

The $4^{th}$ aspect of the present invention is the illumination device according to the $3^{rd}$ aspect of the present invention, wherein said second lens array is formed without a center of curvature of lenses, on which the images formed via said another lens of said first lens array are formed, on said second lens array being changed substantially.

The $5^{th}$ aspect of the present invention is the illumination device according to the $4^{th}$ aspect of the present invention, wherein the plural lenses, on which the images formed via said another lens of said first lens array, on said second lens array are arranged across at least one lens on which the images formed via said predetermined lens of said first lens array.

The $6^{th}$ aspect of the present invention is the illumination device according to the $5^{th}$ aspect of the present invention, wherein said plural light sources comprise a first light source and a second light source,
said second lens array includes a first lens, a second lens, a third lens, and a fourth lens,
the first lens and the third lens of illuminating images, which have passed through the predetermined lens of said first lens array, on said light-receiving surface are formed on said second lens array,
the second lens and the fourth lens of illuminating images, which have passed through said another lens of said first lens array, on said light-receiving surface are formed on said second lens array,
a center of curvature of said first lens and a center of curvature of said third lens substantially coincide with each other to form a first center of curvature, and a center of curvature of said second lens and a center of curvature of said fourth lens substantially coincide with each other to form a second center of curvature different from said first center of curvature, and
said first lens, said second lens, said third lens, and said fourth lens are arranged in this order.

The $7^{th}$ aspect of the present invention is the illumination device according to the $1^{st}$ aspect of the present invention, wherein, in said second lens array, an aperture of a lens close to an optical axis is formed larger than an aperture of a lens distant from the optical axis, and an aperture of a lens distant from the optical axis is formed smaller than an aperture of a lens close to the optical axis.

The 8$^{th}$ aspect of the present invention is the illumination device according to the 1$^{st}$ aspect of the present invention, wherein said first lens array is formed such that, in a first predetermined space which is a largest space of spaces among plural images formed on said second lens array by the predetermined lens of said first array, a largest image among images formed on said second lens array with a second predetermined space, which is smaller than said first predetermined space, apart from each other by said another lens of said first lens array is arranged.

The 9$^{th}$ aspect of the present invention is the illumination device according to the 8$^{th}$ aspect of the present invention, wherein said plural light sources comprise a first light source and a second light source, and said first lens array is formed such that a value obtained by dividing a width of an image according to a first light source, which is formed by the predetermined lens of said first lens array, by said second predetermined space is equal to or larger than a value found by dividing a width of an image according to a second light source, which is formed by said another lens of said first lens array, by said first predetermined space.

The 10$^{th}$ aspect of the present invention is the illumination device according to the 1$^{st}$ aspect of the present invention, further comprising a display device of providing video information, which is arranged a predetermined space apart from said second lens array, between said second lens array and said light receiving surface.

The 11$^{th}$ aspect of the present invention is an illumination method comprising:

a step of reflecting light irradiated from plural light sources in predetermined directions with reflecting means in association with the respective light sources and guiding the light to a first lens array having plural lenses which is arranged a predetermined space apart from said reflecting means;

a step of guiding the light from said plural light sources, which has passed through a predetermined lens of said first lens array, onto a lens corresponding to said predetermined lens among plural lenses of a second lens array having plural lenses which is arranged a predetermined space apart from said first lens array and forming images of said plural light sources with a predetermined space apart from each other;

a step of forming said first lens array such that all or a part of plural images, which are formed by another lens different from said predetermined lens of said first lens array, are arranged substantially among said formed images of said plural light sources; and a step of forming said second lens array such that images formed on said second lens array are illuminated on a light-receiving surface in a predetermined relation.

BRIEF DESCRIPTION OF THE DRAWINGS

FIG. 14(a) is a schematic diagram illustrating an operation principle of the conventional illumination device having irregular-shaped aperture lenses; and FIG. 14(b) is a schematic diagram illustrating an operation principle of the conventional illumination device having irregular-shaped aperture lenses.

Figure 1:
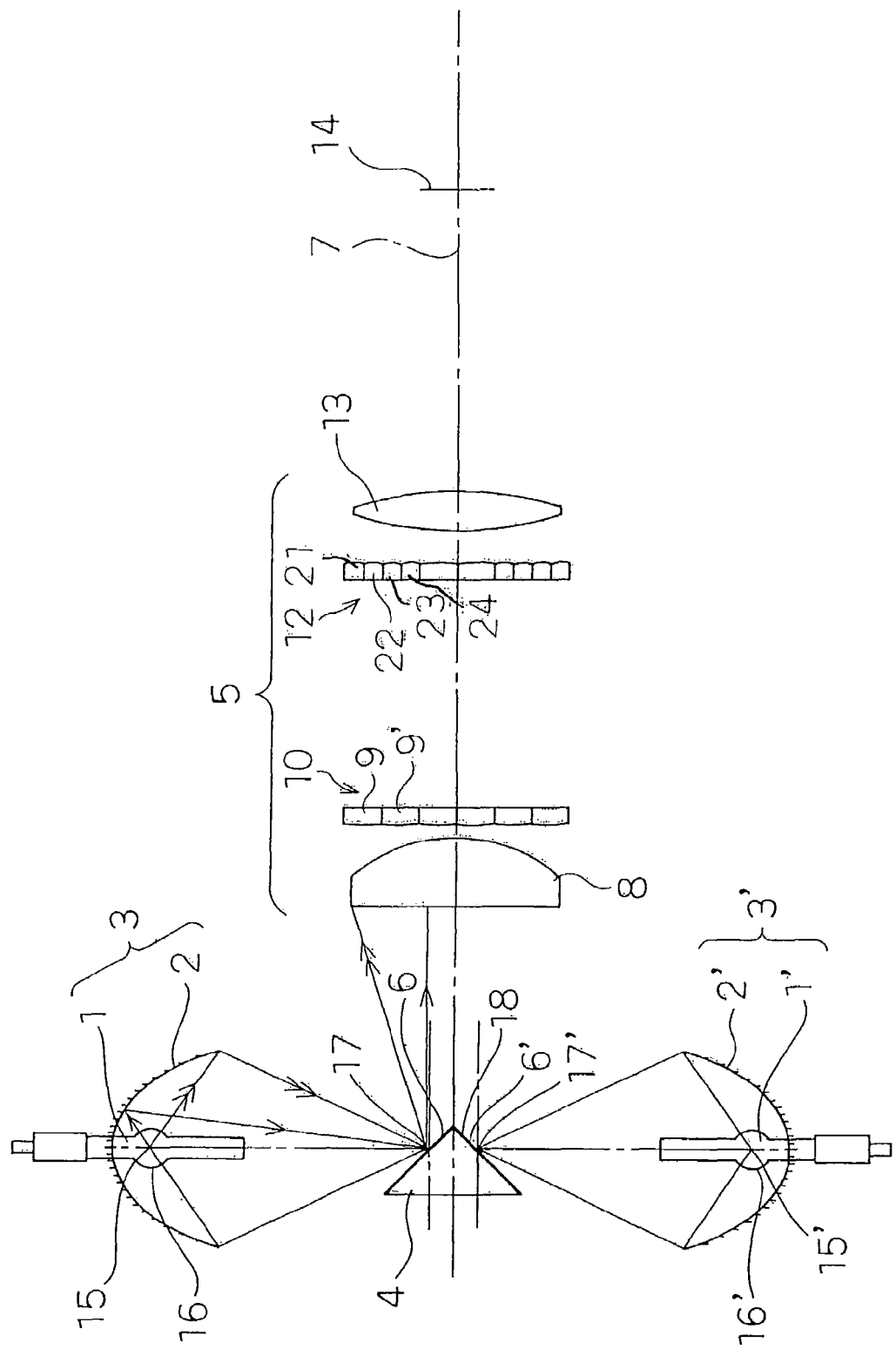
FIG. 1 is a schematic diagram of an illumination device of an embodiment of the present invention.

DESCRIPTION OF REFERENCE NUMERALS 1, 1' Lamps
2, 2' Ellipsoidal mirrors
3, 3' Lamp units
4 Prism
5 Illumination unit
6, 6' Synthesis mirrors 7 Optical axis
8, 9, 11, 13 Lenses
10, 12 Lens arrays
14 Light-receiving surface
15, 15' First focuses
16, 16' Light-emitting portions
17, 17' Second focuses
18 Side

BEST MODE FOR CARRYING OUT THE INVENTION

A structure and an operation of an illumination device of an embodiment of the present invention will be hereinafter described with reference to the drawings. FIG. 1 shows a schematic structure of the illumination device in accordance with the embodiment of the present invention.

The illumination device of this embodiment is constituted by including: two lamp units 3 as an example of plural light sources of the present invention which include lamps 1 and ellipsoidal mirrors 2 serving as condensing means; a triangular prism 4 as an example of reflecting means of the present invention, a side 18 of which is coated with a reflection film to form a synthesis mirror 6 as an example of a reflection surface of the present invention; a lens 8 which is arranged a predetermined space apart from the prism 4 and changes light beams, which are irradiated from the lamp units 3 and reflected on the synthesis mirror 6, to light beams substantially parallel to an optical axis of an illumination unit 5; a lens array 10 as an example of a first lens array of the present invention which is set a predetermined space apart from an outgoing side of the lens 8 and has a shape with plural lenses 9 arranged in a two-dimensional shape; a lens array 12 as an example of a second lens array of the present invention which is arranged a predetermined space apart from an outgoing side of the lens array 10 and has a shape with plural lenses arranged in a two-dimensional shape; a lens 13 which is arranged a predetermined space apart from an outgoing side of the lens array 12 and is used for irradiating a light beam emitted from the lens array 12 on a light-receiving surface; and a light-receiving surface 14 which is arranged a predetermined space apart from the lens 13 and is used for irradiating a light beam emitted from the lens 13.

As the lamp 1, a very high pressure mercury lamp in which a light-emitting material such as mercury or inert gas is enclosed in a glass tube and a pressure in the glass tube at the time of lighting rises to a very high pressure or, other than the very high pressure mercury lamp, a lamp such as a metal halide lamp, a xenon lamp, or a halogen lamp excellent in light-emitting efficiency is used.

A light-emitting portion 16 of the lamp 1 is arranged in a first focus 15, which is one focus of the ellipsoidal mirror 2 and condenses light irradiated from the lamp 1 on a second focus 17 side which is another focus of the ellipsoidal mirror 2. A mirror surface of the synthesis mirror 6 is arranged in the vicinity of the second focus 17 of this ellipsoidal mirror 2 and can reflect light emitted from the ellipsoidal mirror 2 in a direction of the illumination unit 5. Similarly, light irradiated from the lamp 1' of the other ellipsoidal mirror 2', which is arranged to be opposed to one ellipsoidal mirror 2, is also condensed by the other ellipsoidal mirror 2' and then reflected in a predetermined direction on a mirror surface of the other synthesis mirror 6' of the prism 4. Consequently, the light irradiated from the two lamps 1 and 1' is made incident on the illumination unit 5 as light beams traveling in substantially the same direction.

The light emitted from the ellipsoidal mirrors 2 and 2' in the vicinity of the synthesis mirrors 6 and 6' is condensed in small light source images in the vicinity of the second focuses 17 and 17' and travels expanding to the illumination unit 5 side with the vicinity of the reflection surfaces of the synthesis mirrors 6 and 6' as start points. The light traveling while expanding in this way is made incident on the lens 8 and is converted into light beams substantially parallel with the optical axis 7 of the illumination unit 5 to exit from the lens 8.

The light beams having exited from the lens 8 are guided into the plural lenses 9 of the lens array 10 and divided into partial light beams. The divided respective partial light beams are focused on the lens array 12, which has lenses corresponding to the respective lenses in the lens array 10, in shapes similar to apertures of the respective lenses and superimposed one on top of another on the light-receiving surface 14 serving as an area, which should be illuminated, via the lens 13. Consequently, although unevenness of brightness exists in the light beams at the point when the light beams are made incident on the lens array 10, the respective partial light beams having various luminance distributions are superimposed one on top of another, whereby illumination with high uniformity is realized in the area which should be illuminated.

The lens array 10 and the lens array 12 are arranged a space apart from each other such that the partial light beams divided by the lens array 10 are condensed in the vicinity of the lens array 12. In addition, in the optical system shown in FIG. 1, since there is one light source image formed on the synthesis mirrors 6 and 6', respectively, the respective partial light beams condensed by the respective lenses 9 also form two light source images.

Therefore, light source images of a number, which is found by multiplying the number of lenses 9, 9', included in the lens array 10 by the number of light source images formed on the synthesis mirror 6 and the synthesis mirror 6', are formed on the lens array 12.

In the illumination device of the embodiment of the present invention, lenses in the peripheral part among the lenses of the lens array 12 are divided so as to efficiently include the respective light source images. In addition, as shown in FIG. 1, the lenses 9, 9', etc. which constitute the lens array 10, are arranged to be decentered such that light source images are formed on the divided lenses of the lens array 12. In other words, for example, in the example shown in FIG. 1, the lens 9 is decentered such that two light source images from the lens 9 of the lens array 10 are formed as light source images 27 and 29 on a lens 21, which is an example of a first lens of the present invention, and a lens 23, which is an example of a third lens of the present invention, of the lens array 12, respectively, and two light source images from the lens 9' separate from the lens 9 are formed as light source images 28 and 30 on a lens 22, which is an example of a second lens of the present invention, and a lens 24, which is an example of a fourth lens of the present invention, of the lens array 12, respectively.

According to the related art, the light source image corresponding to the lens 9 is formed on a lens 11 (a lens having an area consisting of the lenses 21, 22 and 23 are assumed and called in this way) of the lens array 12, and the light source image corresponding to the lens 9' is formed on a lens 11' (a lens having an area consisting of the lenses 22, 23 and 24 and not overlapping the area of the lens 11 is assumed and called in this way) of the lens array 12. The division of the lens array 12 means that the lens 11 is divided into the lenses 21, 22 and 23 and the lens 11' is divided into the lenses 22, 23 and 24 as described above.

The lenses of the lens array 12 are divided in this way to be arranged such that one light source image is placed between the other light source images, whereby an area of the peripheral part on the lens array 12 can be reduced (e.g., to ⅘) compared with the second lens array 112 of the related art.

Figure 2:
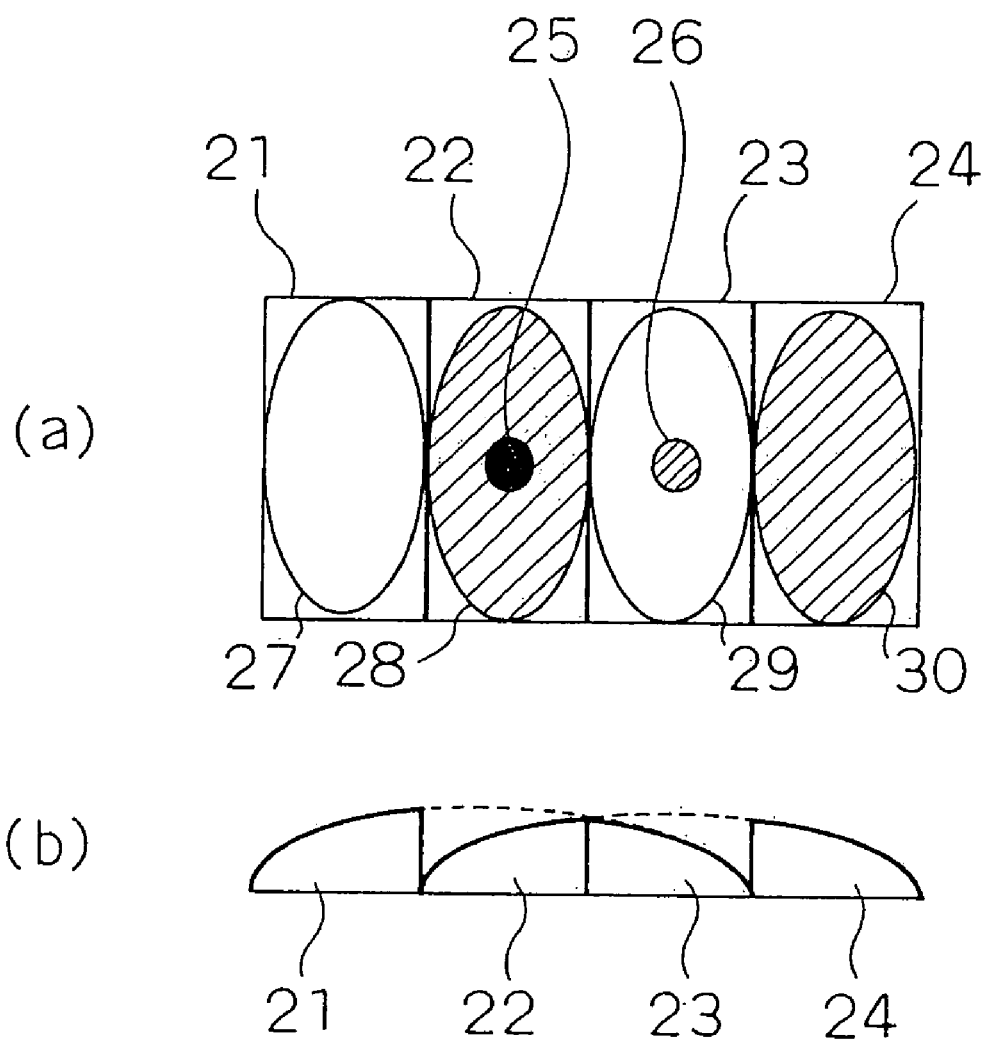
FIG. 2(a) is a plan view showing an example of a shape of a second lens array of the illumination device of the embodiment of the present invention.
FIG. 2(b) is a sectional view showing the example of the shape of the second lens array of the illumination device of the embodiment of the present invention.

Such a concept of the lens division in the lens array 12 is illustrated more specifically in FIGS. 2(*a*) and (*b*). In short, as shown in FIGS. 2(*a*) and (*b*), the apertures of the lenses in the peripheral part of the lens array 12 are divided into the lens 21 and the lens 23, which are apertures corresponding to a light source image from the predetermined lens 9 of the lens array 10, and the lens 22 and the lens 24, which are apertures corresponding to a light source image from separate lens 9' other than the predetermined lens 9. Then, the lens 21, the lens 22, the lens 23, and the lens 24 are arranged in this order. In addition, a center of curvature 25, which is an example of a first center of curvature of the present invention, of the lens 21 and the lens 23 and a center of curvature 26, which is an example of a second center of curvature of the present invention, of the lens 22 and the lens 24 are arranged to be adjacent to but deviated from each other. In other words, a center of curvature of the lens 21 and a center of curvature of the lens 23 substantially agree with each other to form the center of curvature 25, and a center of curvature of the lens 22 and a center of curvature of the lens 24 substantially agree with each other to form the center of curvature 26. The center of curvature 25 and the center of curvature 26 are arranged to be deviated from each other.

The center of curvature 25 of the lenses 21 and 23 agrees with a center of curvature of the lens 11. In addition, the center of curvature 26 of the lenses 22 and 24 agrees with a center of curvature of the lens 11'. In other words, the centers of curvature of the lenses 11 and 11' are formed without being changed substantially regardless of whether the lenses 11 and 11' are divided or not (i.e., substantially preserved before and after the division of the lenses 11 and 11'). In other words, the centers of curvature 25 and 26, in the case in which the lenses 11 and 11' are divided, are formed to agree with the center of curvature in the case in which the lenses 11 and 11' are not divided.

FIG. 2(*a*) shows a plan view of such lenses 21 to 24 formed on the lens array 12, and FIG. 2(*b*) shows a sectional view thereof. With such a constitution, individual light source images condensed by the lens 9 pass through the lenses 21 and 23 having the center of curvature 25, and individual light source images condensed by the lens 9' pass through the lenses 22 and 24 having the center of curvature 26. The light source images are efficiently irradiated as effective light beams on the light-receiving surface 14 serving as an area which should be illuminated.

In this way, the lenses in the peripheral part of the lens array 12, in which a large gap tends to be formed between a pair of light source images formed by the lens 9 of the lens array 10, are divided, and pairs of the divided lenses have predetermined centers of curvature, respectively. Thus, a gap between light source images formed on the lens array 12 can be reduced, and the light source images can be included more efficiently with a small aperture than in the past.

For example, in the conventional illumination device, the light source images 27 and 29 are focused in the area formed of the lenses 21, 22 and 23 on the lens array 12, and the light source images 28 and 30 are focused in the area formed of the lenses 22, 23 and 24 which is an area separate form the area in which the area of the lenses 21, 22 and 23 is formed.

Therefore, when it is assumed that areas of the lenses 21 to 24 are identical, in order to focus a light source image from the predetermined lens 9 and a light source image from the separate lens 9' on the lens array 12, an area equivalent to six lenses 21 is required.

However, according to the illumination device of the present invention, with an area equal to four lenses 21, a light source image from the predetermined lens 9 and a light source image from the separate lens 9' can be focused on the lens array 12. Therefore, it is possible to cause an area, which can be saved in the peripheral part of the lens array 12, to contribute to an increase in apertures of the lenses in the central part of the lens array 12. Alternatively, by reducing the area in the peripheral part of the lens array 12 as described above, an area of the entire lens array 12 can be made smaller than the conventional irregular-shaped aperture lenses, and miniaturization of the illumination device itself can also be realized.

Note that the example shown in FIGS. 2(*a*) and (*b*) is an example. In particular, concerning the centers of curvature 25 and 26, arrangements other than the illustration are naturally conceivable.

In the illumination device of the present invention, parts (gaps) on the lens array 12, where light source images are not arranged, are eliminated as much as possible, and a filling factor of light source images on the lens array 12 is increased, whereby an illumination system with higher efficiency can be realized by a smaller optical system.

In this way, efficiency of the illumination device can be improved more when the lenses arranged in the peripheral part of the lens array 12 are divided and the number of lenses of the lens array 12 is increased.

However, when the number of lenses of the lens array 12 is increased without any limitation, even if a light source image formed by the separate lens 9' is moved to between a pair of light source images formed in the central part of the lens array 12, since a light source image in the vicinity of the optical axis is large, there is no gap between the pair of light source images, and there is almost no place for arranging the new light source image. In other words, on the lenses in the central part of the lens array 12, most of light source images formed by the separate lens 9' overlap the existing light source images. In this case, since a position of a center of curvature of the lenses has to be associated with one of the lenses 9 and 9', any one of the light source images in the overlapping part of the light source images does not reach an area which should be illuminated, which leads to a loss in terms of illumination efficiency.

Therefore, in order to obtain the above-described effects more surely, the number of lenses NLA2 of the lens array 12 only has to satisfy the following relation with respect to the number of lenses NLA1 of the lens array 10:

$$NLA1 < NLA2 < 2 \times NLA1 \qquad \text{(Expression 2)}$$

Figure 3:
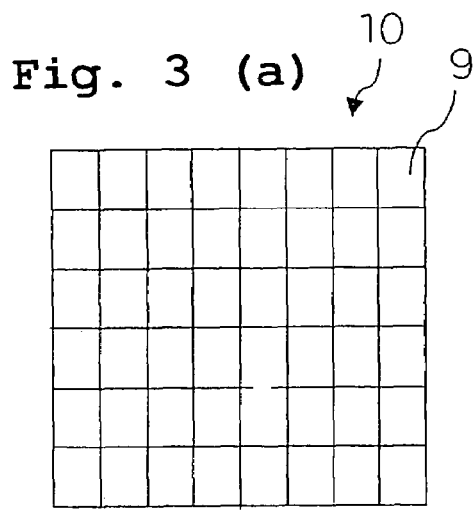
FIG. 3(a) is a plan view of a lens array which is used in the illumination device of the embodiment of the present invention.
FIG. 3(b) is a plan view of a lens array which is used in the illumination device of the embodiment of the present invention.
FIG. 3(c) is a plan view of a lens array which is used in the illumination device of the embodiment of the present invention.
FIG. 3(d) is a plan view of a lens array which is used in the illumination device of the embodiment of the present invention.
Figure 3:
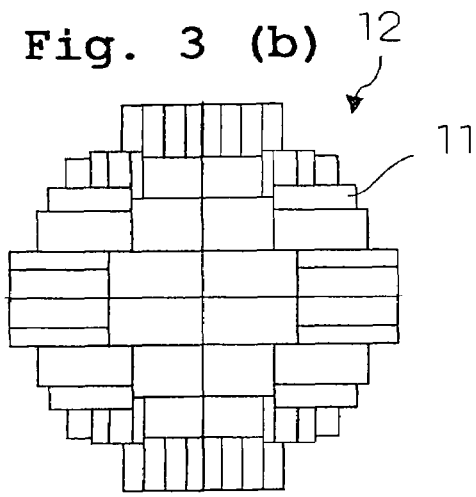
Figure 3:
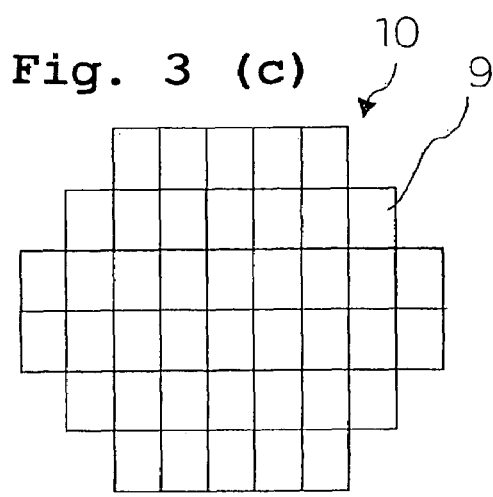
Figure 3:
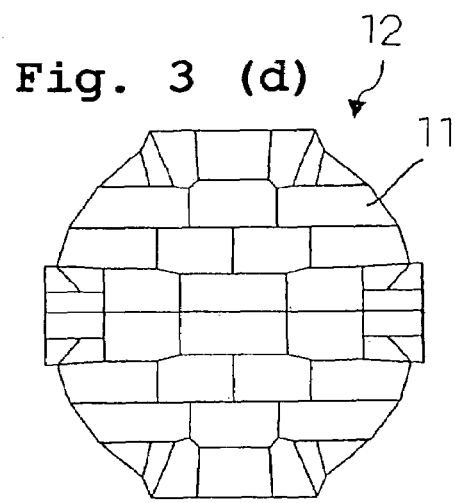

Shapes of the lens array 10 and the lens array 12 may be any shapes as long as the above (expression 2) is satisfied. As such an example, FIG. 3(*a*) shows an example of a shape of the lens array 10 in the case in which the number of the lenses 9 is forty-eight, and FIG. 3(*b*) shows an example of a shape of the lens array 12, which has sixty lenses, corresponding to the lens array 10 shown in FIG. 3(*a*). In addition, FIG. 3(*c*) shows an example of a shape of the lens array 10 in the case in which the number of the lenses 9 of the lens array 10 is forty-two. Further, FIG. 3(*d*) shows an example of a shape of the lens array 12, which has forty-six lenses, corresponding to the lens array 10 shown in FIG. 3(*c*) A part of the lenses of the lens array 12 is divided in this way, whereby a size of the entire lens array 12 can be reduced to make the entire illumination device small, or sizes of the apertures of the lenses in the central part of the lens array 12 can be further increased so much more for the reduction of a gap between the pair of light source images formed in the peripheral part of the lens array 12. Thus, it becomes possible to improve efficiency of use of light.

Next, it will be explained, when at least one light source image of a pair of light source images, which are formed by the lens 9' separate from the predetermined lens 9 of the lens array 10, is arranged between a pair of light source images formed by the predetermined lens 9 of the lens array 10, which of the pair of light source images formed by the separate lens 9' should be moved to a gap between the pair of light source images formed by the predetermined lens 9.

Figure 4:
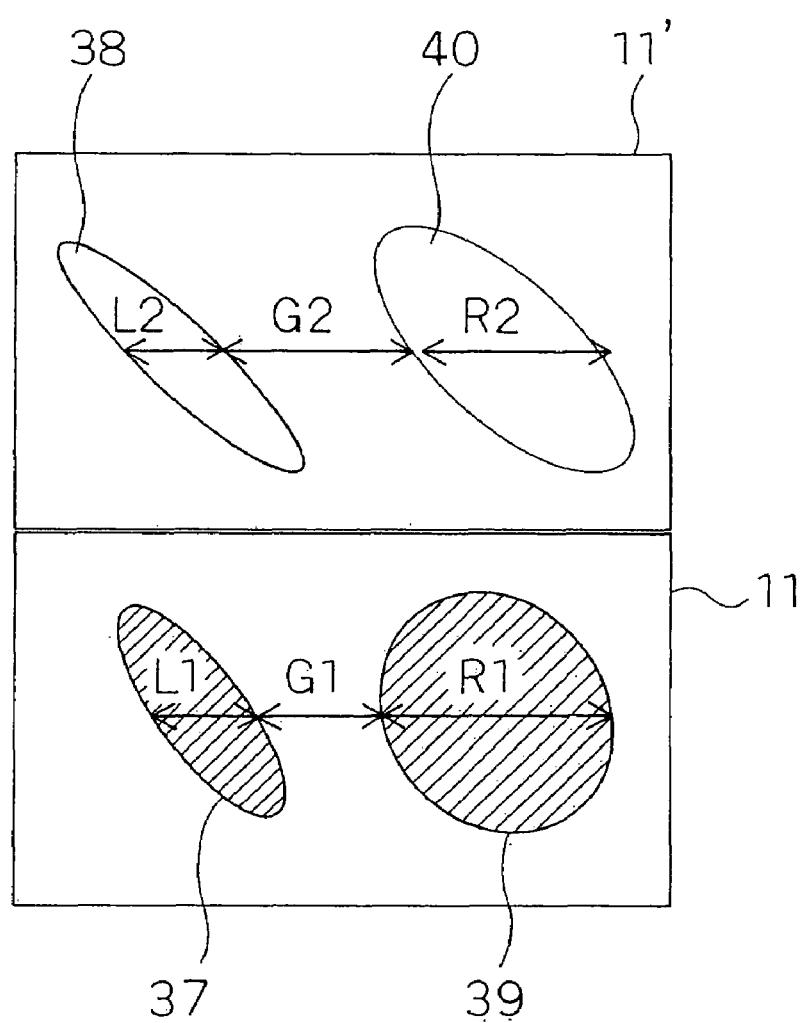
FIG. 4 is a schematic diagram showing a determination method for an arrangement of light source images of the illumination device of the present invention.
Figure 5:
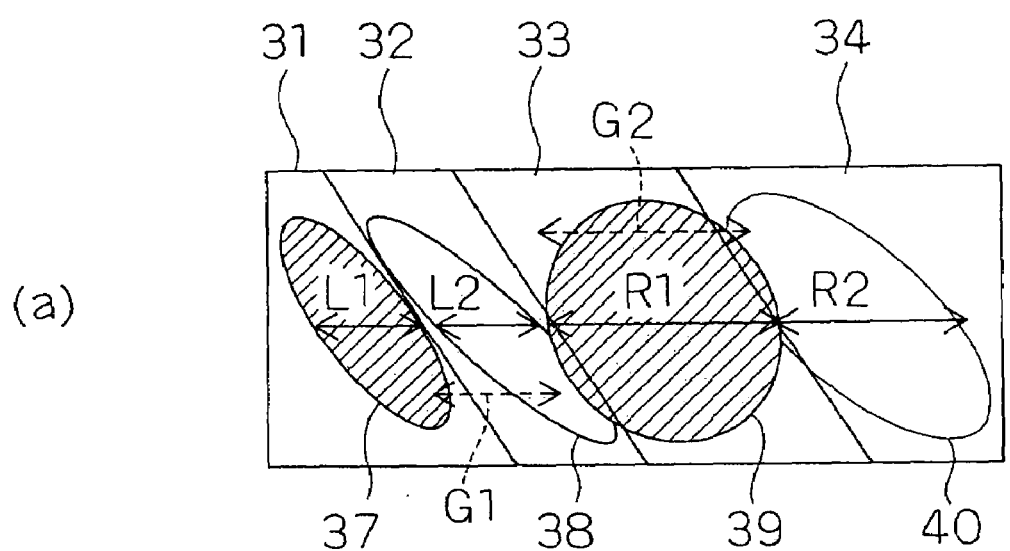
FIG. 5(a) is a plan view showing an example of a shape of a second lens array of the illumination device of the embodiment of the present invention.
FIG. 5(b) is a sectional view showing the example of the shape of the second lens array of the illumination device of the embodiment of the present invention.
Figure 5:
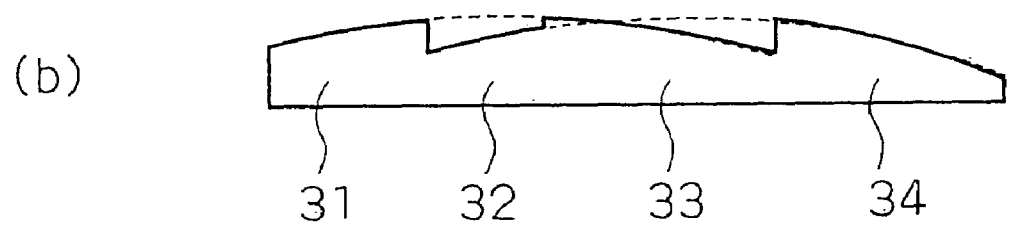

FIG. 4 and FIG. 5 show examples in which light source images, which are actually formed in the peripheral part of the lens array 12, are used. As shown in FIG. 4, it is assumed that, in a pair of light source images formed by the one predetermined lens 9, a width of a large light source image on a straight line connecting area centers of the respective light source images is R1, a width of a smaller light source image is L1, and a width of a gap between the light source images is G1, and similarly, widths of a pair of light source images formed by the separate lens 9' (i.e., light source images which would be originally formed on an imaginary lens 11' on the lens array 12 corresponding to the lens 9' in the case in which the lens 9' is assumed not to be decentered) are R2 and L2, and a width of a gap between these light source images is G2. In the case in which such two pairs of light source images are combined, efficiency is better when the images are arranged such that a rate of the width (R1 or R2) of the large image with respect to the width (G1 or G2) of the gap between the respective light source images is as small as possible.

In other words, the arrangement among the respective light source images only has to be determined such that the following relation is satisfied:

$$R2/G1 \geq R1/G2 \quad \text{(Expression 3)}$$

For example, in the examples shown in FIG. 4 and FIG. 5, efficiency is better with a constitution in which, rather than inserting a light source image 38 having the width L2 in the gap of G1 or inserting a light source image 37 having the width L1 in the gap of G2, a light source image 39 having the large width R1 larger than a light source image 40 having the width R2 is inserted in the gap of G2 larger than G1.

For example, FIG. 5(a) two-dimensionally shows a part of a structure of the lens array 12 in the case in which the light source image 38 is arranged between the light source images 37 and 39 and FIG. 5(b) shows a section thereof. Although a lens 31 and a lens 33 are different lenses, these lenses have an identical center of curvature and are arranged across a lens 32. Further, although the lens 32 and a lens 34 are different lenses, these lenses have an identical center of curvature and are arranged across the lens 33. In this case, the center of curvature formed by the lenses 31 to 33 and the center of curvature formed by the lenses 32 to 34 are arranged to be adjacent to but deviated from each other.

However, even in the case in which the above-described arrangement is not adopted, the same effect as described above can be obtained in that efficiency can be made higher than the conventional method and a size of the illumination device can be reduced.

In addition, in the case in which a gap between a pair of light source images is large, and a small light source image formed by the separate lens 9' is inserted in the gap between the light source images, a constitution for inserting two or more pairs of light source images formed by plural separate lenses 9' or the like rather than a pair of light source images may be adopted. In this case, again, the respective lenses after division of the lens array 12 are arranged with positions of centers of curvature thereof adjacent to but deviated from each other in an area included in the lens 11, through which the pair of light source images pass, such that light beams from the corresponding lenses 9 and 9' or the like become effective illumination reaching an area which should be illuminated. In addition, the lenses 9 and 9' or the like are arranged to be decentered such that light beams passing through the lenses or the like are condensed by the lens 11.

Figure 6:
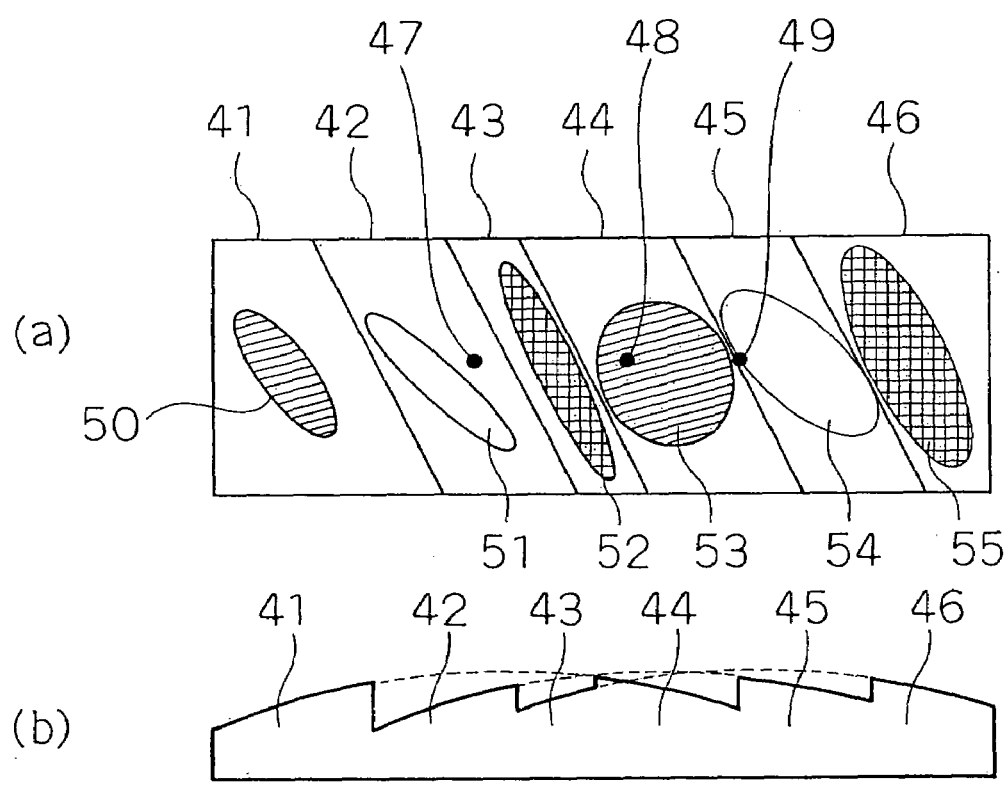
FIG. 6(a) is a plan view showing an example of a shape of the second lens array of the illumination device of the embodiment of the present invention.
FIG. 6(b) is a sectional view showing the example of the shape of the second lens array of the illumination device of the embodiment of the present invention.

For example, FIG. 6(a) shows, as a plan view, a part of a structure of the lens array 12 in the case in which a light source image 51 and a light source image 52 are arranged between light source images 50 and 53, and FIG. 6(b) shows a section thereof. In this case, a center of curvature 47 is formed by lenses 41 to 44, a center of curvature 48 is formed by lenses 42 to 45, and a center of curvature 49 is formed by lenses 43 to 46. The centers of curvature 47, 48 and 49 are arranged to be adjacent to but deviated from each other.

In other words, a center of curvature of the lens 41 and a center of curvature of the lens 44 substantially agree with each other to form the center of curvature 47, a center of curvature of the lens 42 and a center of curvature of the lens 45 substantially agree with each other to form the center of curvature 48, and a center of curvature of the lens 43 and a center of curvature of the lens 46 substantially agree with each other to form the center of curvature 49. The centers of curvature 47, 48 and 49 are arranged to be deviated from each other. However, the respective centers of curvature are formed without change regardless of whether the lens 11 is divided or not as in the case shown in FIGS. 2(a) and (b).

In this way, the lens array 10 and the lens array 12 are formed so as to fill a gap between light source images with another light source image as much as possible, whereby a distance among the respective centers of curvature formed on the predetermined lens 11 on the lens array 12 can be reduced. Therefore, in that case, the size of the entire lens array 12 can be further reduced, or a diameter in the central part of the lens array 12 can be increased, whereby efficiency of use of light can be improved.

Figure 7:
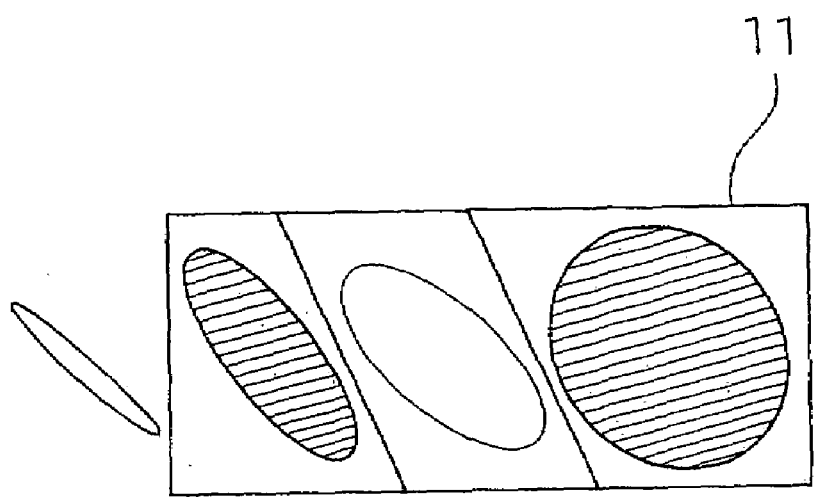
FIG. 7 is a plan view showing an example of the shape of the second lens array of the illumination device of the embodiment of the present invention.

In addition, as shown in FIG. 7, in the lenses after division of the lens array 12, in the case in which one pair of light source images among two pairs of light source images are relatively small and do not contribute to overall efficiency of use of light significantly, the lens 11 may be constituted by three or two of four lenses 11.

As described above, according to the present invention, the lens array 12 is divided to be smaller than the lens array 10, whereby gap areas, which are generated among plural light source images formed on the lens array 12, can be reduced, and an illumination device with high efficiency of use of light can be obtained. In addition, if the illumination device of the present invention is used, a projection display device with high efficiency of use of light can be realized.

Figure 12:
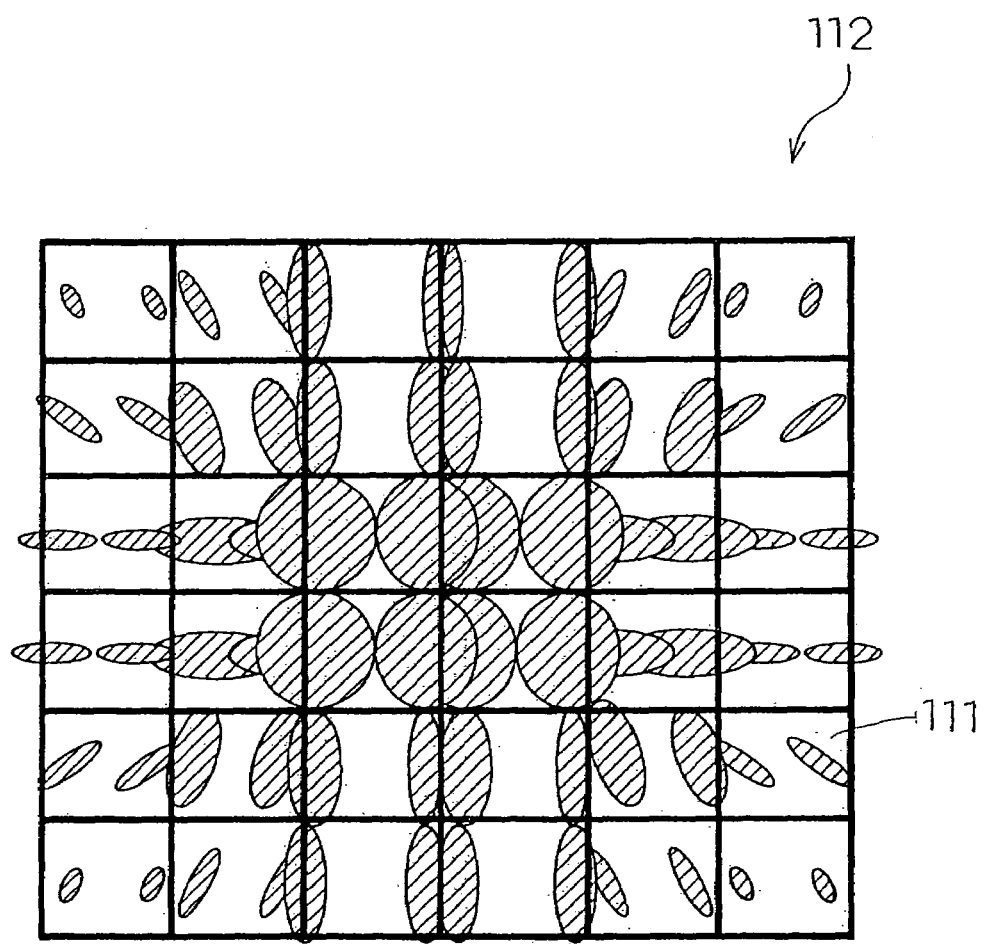
FIG. 12 is a schematic diagram showing an example of plural light source images which are focused on a second lens array of the conventional illumination device having plural light sources.
Figure 13:
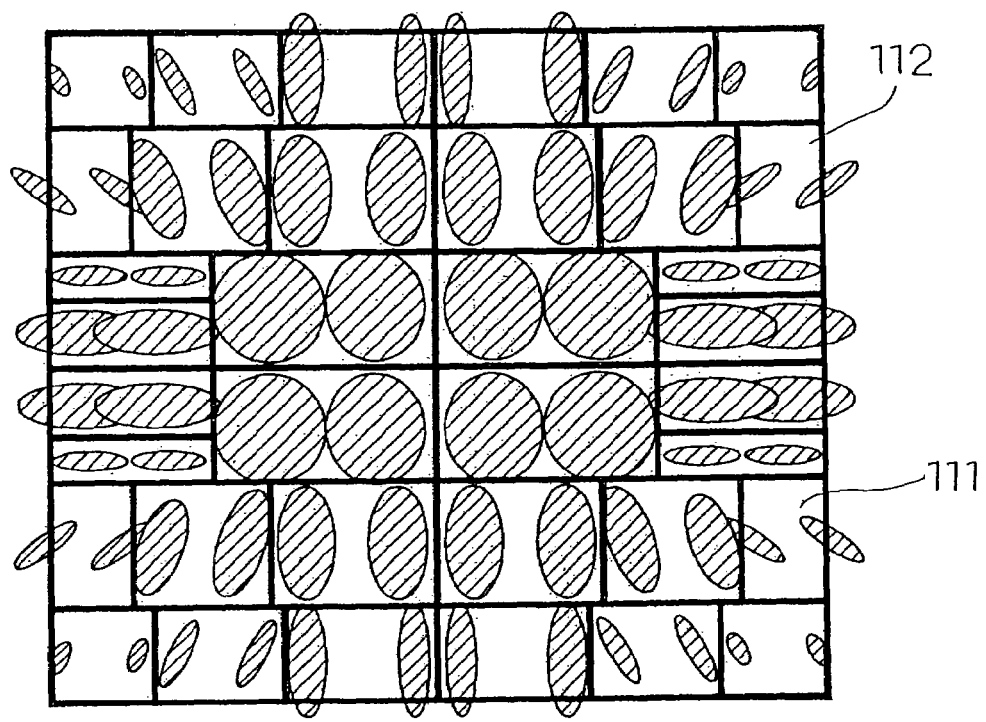
FIG. 13 is a schematic diagram showing an example of plural light source images which are focused on a second lens array of a conventional illumination device having plural light sources and having irregular-shaped aperture lenses.

Note that outward forms, which are illustrated for representing sizes of light source images shown in FIGS. 12 and 2(a), are indicated by equi-luminance lines having luminance of 10 to 30% in the case in which a maximum luminance in the light source image is assumed to be 100%. Such equi-luminance lines are indicators indicating a range in which efficiency of use of light is affected by taking in light as a light source image in the aperture of the lens 11. Thus, by the above formation of the lens arrays 10 and 12 in the case in which all the outward forms of these equi-luminance lines are contained in the lens 11, a significant effect can be obtained by using the above-described method. However, even in the case in which the outward forms of the equi-luminance lines partly overlap each other, or even in the case in which a part of the outward forms of the equi-luminance lines bulges out from the lens 11, it is possible that effects such as improvement of efficiency and reduction in a size of the lens array 12 can be obtained as the optical system as a whole.

In addition, a gap or a space between plural light source images in the above description have been represented as a distance from one equi-luminance line to another equi-luminance line on a line connecting area centers of images surrounded by the equi-luminance lines. However, the space between the light source images may be defined by other methods.

Further, in the above description, the triangular prism 4 having the synthesis mirrors 6 and 6', the sides of which are coated with a reflective film, is described as the reflecting means of the present invention. However, the reflecting means of the present invention is not limited to the prism 4 but may be a structure using two mirrors and may be any structure as long as the structure reflects light beams irradiated from two light sources to the illumination unit 5.

Moreover, in the above description, the example of using the ellipsoidal mirror 2 as the condensing means is described. However, the condensing means may be a parabolic mirror. Furthermore, it is also conceivable that a lens is used as the condensing means. In that case, since a size of a light source image does not change significantly in the central part and the peripheral part of the second lens array 12, a shape of the lens array 12 is not required to be irregular-shaped apertures. Further, in the case in which light source images formed on predetermined one lens 11 on the lens array 12 are spaced apart from each other, a constitution may be adopted in which a light source image, which is formed by the lens 9' separate from the predetermined lens 9 corresponding to the predetermined lens 11, is formed between light source images which are formed on the predetermined lens 11 in the same manner as described above. In such a case, the same effect as described above can be obtained.

In addition, in FIG. 1, behind the lens array 12, the lens 13 is illustrated as the optical means of matching light to a shape of the light-receiving surface 14 side, which should be illuminated, and converting the light into illumination light having uniformity. However, as a structure of the illumination device of the present invention, the illumination device may have a structure without the lens 13, a structure in which plural single lenses are combined, or a structure of an optical system in which optical elements such as a mirror and a prism are included.

Figure 8:
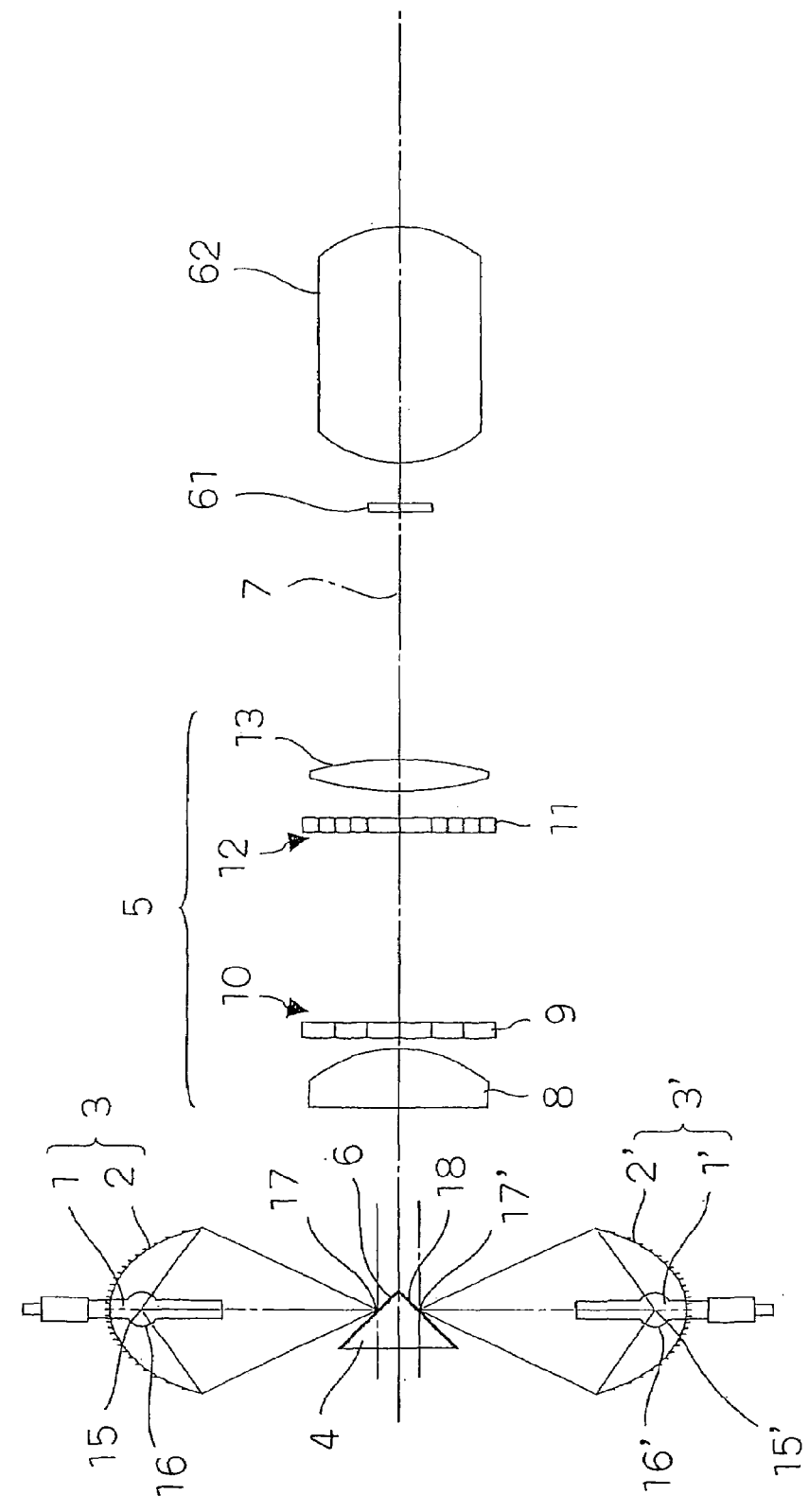
FIG. 8 is a schematic diagram showing one constitutional example of the illumination device of the embodiment of the present invention.
Figure 9:
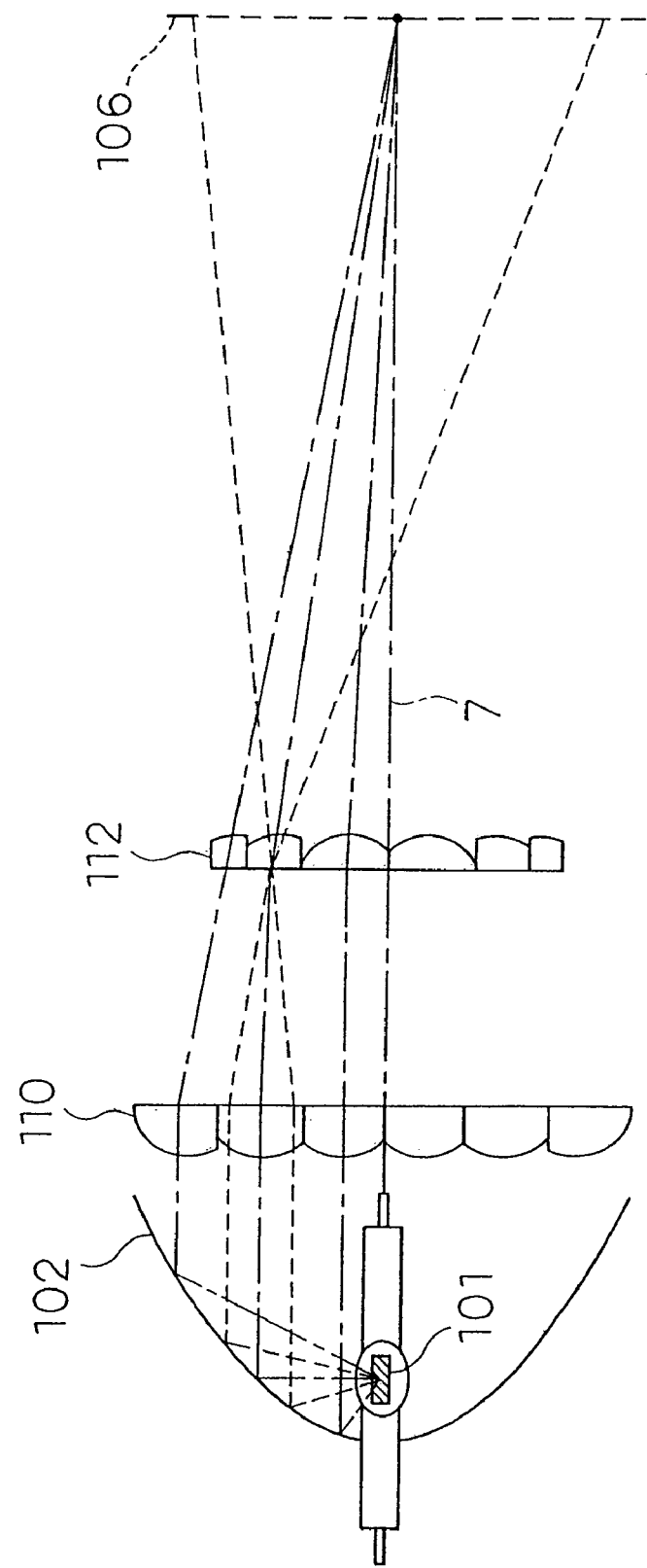
FIG. 9 is a schematic diagram showing a structure of a conventional illumination device having irregular-shaped aperture lenses.
Figure 10:
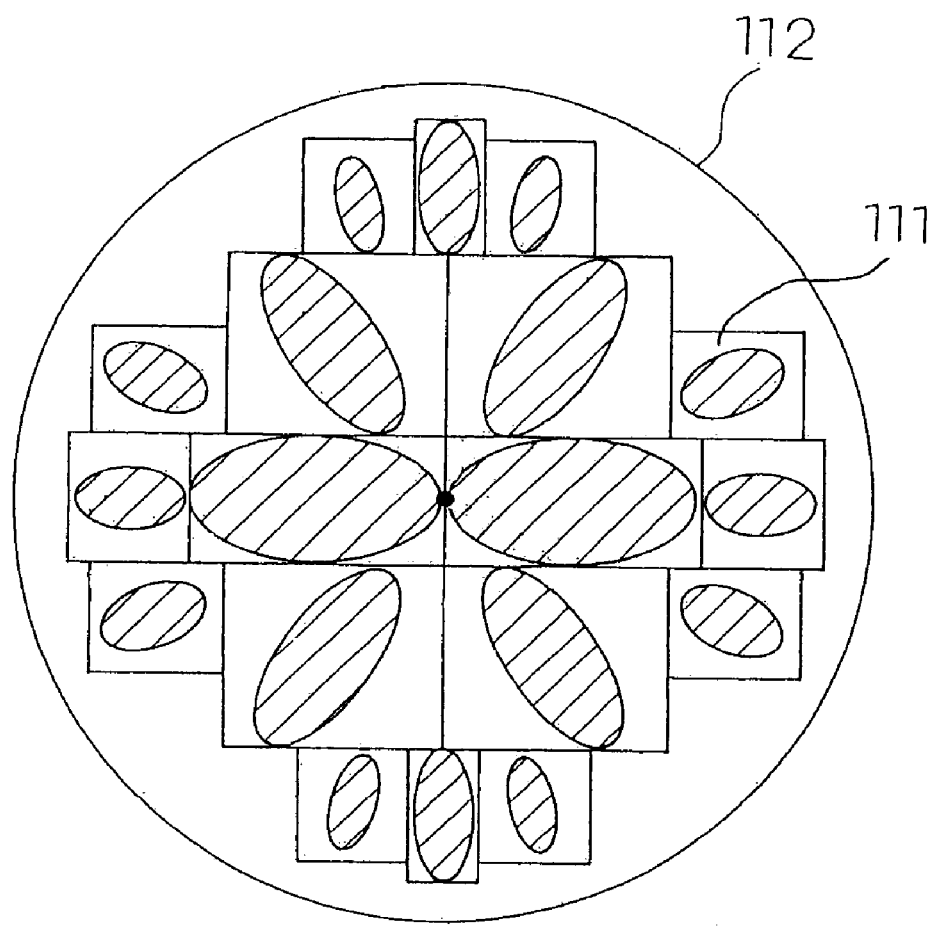
FIG. 10 is a schematic diagram showing an example of light sources images which are focused on a second lens array of the conventional illumination device having irregular-shaped aperture lenses.
Figure 11:
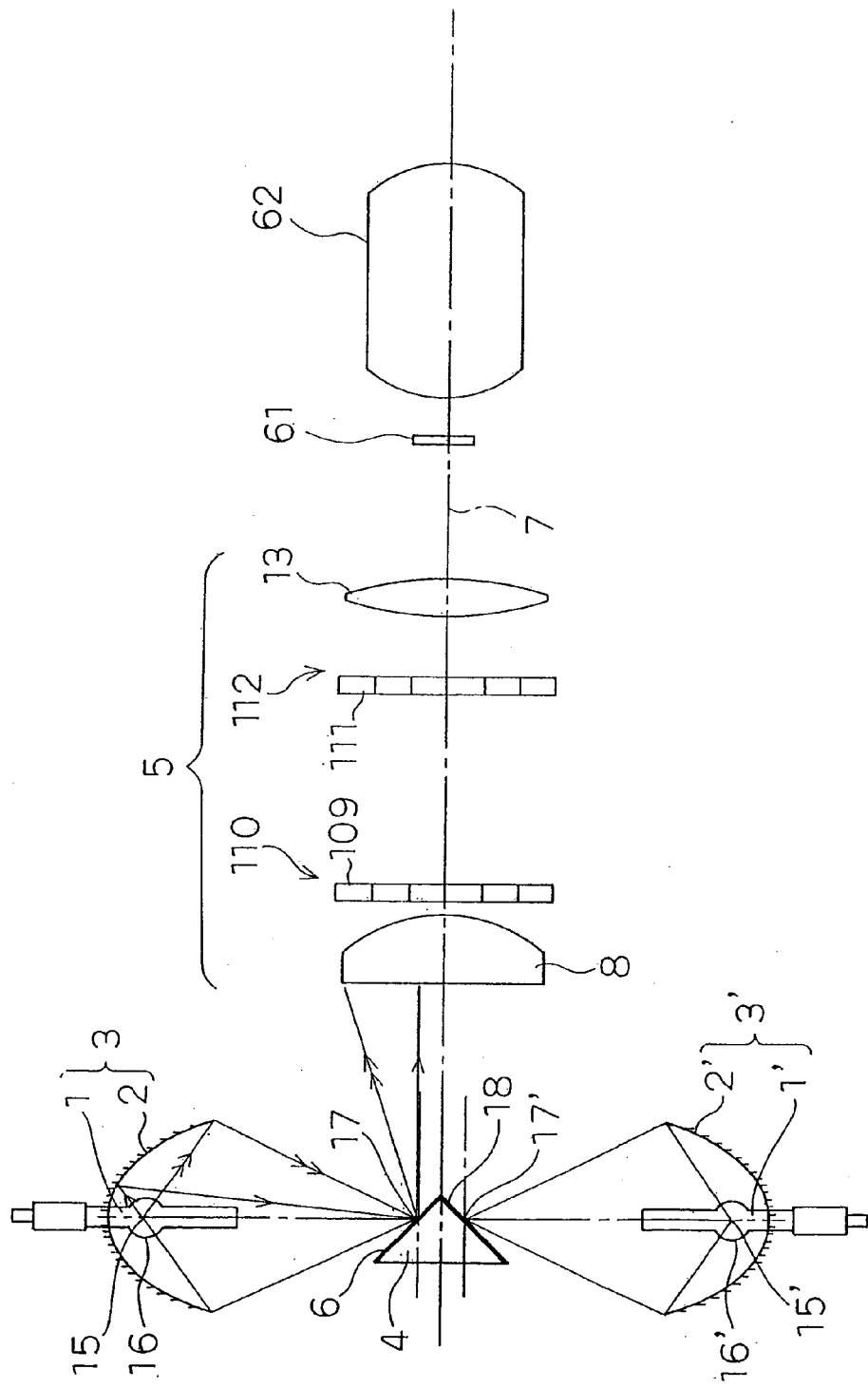
FIG. 11 is a schematic diagram showing a structure of a conventional illumination device having plural light sources.

Further, in the above-described illumination device, as shown in FIG. 8, if a liquid crystal panel 61 (optical modulation device) of a transmission type and a projection lens 62 are provided as an example of the display device of the present invention, a projection display apparatus, which can provide a projection image with high uniformity, can be obtained.

Moreover, in FIG. 8, a structure including only one liquid crystal panel 61 as an optical modulation device is illustrated. However, a structure including plural optical modulation devices may be adopted. In addition, instead of the liquid crystal panel 61 of the transmission type, a transmission light bulb, a reflection light bulb, a mirror panel which can change a direction of reflection with a micro-mirror arranged in array, an optical modulation device of an optical writing system, an image display device, or the like can be used. Moreover, it is conceivable that the display device of the present invention is, for example, a sheet for an OHP.

Further, in FIG. 1, the structure using the two light sources is illustrated. However, a structure using three or more light sources may be adopted. However, in the case in which three or more (N) light sources are used, the number of lenses NLA2 of the lens array 12 only has to satisfy the following relation with respect to the number of lenses 9 NLA1 of he lens array 10:

$$NLA1 < NLA2 < N \times NLA1 \qquad \text{(Expression 4)}$$

In that case, the structure only has to be a structure in which the lens array 10 is formed such that, in a first predetermined space which is a largest space among plural images formed on the lens array 12 by the predetermined lens 9 of the lens array 10, a largest image among images formed on the lens array 12 a second predetermined space, which is smaller than the first predetermined space, apart from each other by the lens 9' separate from the predetermined lens 9 of the lens array 10 is formed.

Moreover, although not shown in the figure, a structure using a prism, a filter, a mirror, or the like, which can perform color separation and color composition, may be adopted.

According to the illumination device and the illumination method in accordance with the present invention, efficiency of use of plural light sources can be improved. Thus, the illumination device and the illumination method are useful in a projection display apparatus and the like.

The invention claimed is:

1. An illumination device comprising:
a plurality of light sources, each light source for irradiating light;
a plurality of reflectors, each reflector having a reflection surface for reflecting said light, which is irradiated from said plurality of light sources;
a first lens array having a plurality of lenses which are arranged a predetermined space apart from said plurality of reflectors, said plurality of lenses comprising first and second lenses; and
a second lens array having a plurality of lenses which are arranged a predetermined space apart from said first lens array,
wherein said first lens array is configured such that:
a first plurality of images are formed a first predetermined space apart from each other on said plurality of lenses of said second lens array, said first plurality of images formed from light from said plurality of light sources passing through said first lens of said first lens array,
a second plurality of images are formed a second predetermined space apart from each other on said plurality of lenses of said second lens array, said second plurality of images formed from light from said plurality of light sources passing through said second lens of said first lens array, and
all or a part of said second plurality of images formed by said second lens is arranged substantially among said first plurality of images formed by said first lens, and
said second lens array is configured such that said light forming said first and second pluralities of light source images on said second lens array illuminates a light-receiving surface in a predetermined relation.

2. The illumination device according to claim 1,
wherein said second lens of said first lens array is formed to be decentered such that all or a part of said second plurality of images formed on said second lens array by said second lens are arranged among said first plurality of images formed on said second lens array by said first lens of said first lens array.

3. The illumination device according to claim 2,
wherein said second lens array is formed such that said second plurality of images formed on said second lens array via said second lens of said first lens array are guided to an area, which is to be illuminated, of said light-receiving surface.

4. The illumination device according to claim 3, wherein:
at least one lens of the plurality of lenses of the second lens array is arranged between at least two other lenses of the plurality of lenses of the second lens array,
at least one of the first plurality of images is formed on each of said at least two other lenses, and
at least one of the second plurality of images is formed on said at least one lens.

5. The illumination device according to claim 4,
wherein said plurality of light sources comprise a first light source and a second light source,
said second lens array includes a first lens, a second lens, a third lens, and a fourth lens,
the first lens and the third lens of said second lens array receive said first plurality of images, which have passed through the first lens of said first lens array, and said first and third lenses of said second lens array illuminate said first plurality of images on said light-receiving surface,
the second lens and the fourth lens of said second lens array receive said second plurality of images, which have passed through said second lens of said first lens array, and said second and fourth lenses of said second lens array illuminate said second plurality of images on said light-receiving surface,
a center of curvature of said first lens of said second lens array and a center of curvature of said third lens of said second lens array substantially coincide with each other to form a first center of curvature, and a center of curvature of said second lens of said second lens array and a center of curvature of said fourth lens of said second lens array substantially coincide with each other to form a second center of curvature different from said first center of curvature, and
said first lens, said second lens, said third lens, and said fourth lens of said second lens array are arranged in numerical order.

6. The illumination device according to claim 1,
wherein, in said second lens array, an aperture of a lens close to an optical axis is formed larger than an aperture of a lens distant from the optical axis, and an aperture of a lens distant from the optical axis is formed smaller than an aperture of a lens close to the optical axis.

7. The illumination device according to claim 1,
wherein said first lens array is formed such that:
a plurality of spaces comprise a third predetermined space which is a largest space in said plurality of spaces,
a largest image of said second plurality of images is formed on said second lens array in said third predetermined space, and
said largest image has a fourth predetermined space that is smaller than said third predetermined space.

8. The illumination device according to claim 7,
wherein said plurality of light sources comprise a first light source and a second light source, and
said first lens array is formed such that a value obtained by dividing a width of an image according to a first light source, which is formed by the first lens of said first lens array, by a width of said second predetermined space is equal to or larger than a second value found by dividing a width of an image according to a second light source, which is formed by said second lens of said first lens array, by a width of said first predetermined space.

9. The illumination device according to claim 1, further comprising a display device for providing video information, which display device is arranged a predetermined space apart from said second lens array, between said second lens array and said light receiving surface.

10. An illumination method comprising:
a step of reflecting light irradiated from a plurality of light sources in predetermined directions with plurality of reflectors in association with the respective light sources and guiding the light to a first lens array having a plurality of lenses, which first lens array is arranged a predetermined space apart from said plurality of reflectors, said plurality of lenses comprising first and second lenses;
a step of guiding the light from said plurality of light sources, which has passed through a first lens of said first lens array, onto a first plurality of lenses of a second lens array having a plurality of lenses to form a first plurality of images, which second lens array is arranged a predetermined space apart from said first lens array, which first plurality of images have a first predetermined space apart from each other;
a step of guiding the light from said plurality of light sources, which has passed through a second lens of said first lens array, onto a second plurality of lenses of said second lens array to form a second plurality of images, which second plurality of images have a second predetermined space apart from each other;
a step of configuring said first lens array such that all or a part of said second plurality of images, which are formed on said second lens array by said second lens of said first lens array, are arranged substantially among said first plurality of images, which are formed on said second lens array by said first lens of said first lens array; and
a step of configuring said second lens array such that images formed on said second lens array are illuminated on a light-receiving surface in a predetermined relation.

11. The illumination device according to claim 1, wherein said first lens array includes at least one lens which is configured to project one image of each of said plurality of light sources onto a different respective lens in said second lens array such that only a single image is projected onto said different respective lens.

* * * * *

UNITED STATES PATENT AND TRADEMARK OFFICE
CERTIFICATE OF CORRECTION

| | |
|---|---|
| PATENT NO. | : 7,125,144 B2 |
| APPLICATION NO. | : 10/512776 |
| DATED | : October 24, 2006 |
| INVENTOR(S) | : Shimaoka et al. |

Page 1 of 1

It is certified that error appears in the above-identified patent and that said Letters Patent is hereby corrected as shown below:

In column 18, line 23 "with plurality of" should read --with a plurality of--.

Signed and Sealed this

Twenty-seventh Day of March, 2007

JON W. DUDAS
*Director of the United States Patent and Trademark Office*